United States Patent
Bitran

(10) Patent No.: US 7,881,252 B2
(45) Date of Patent: Feb. 1, 2011

(54) WIRELESS RECEIVER WITH INTERMITTENT SHUT-OFF OF RF CIRCUITS

(75) Inventor: Yigal Bitran, Ramat Hasharon (IL)

(73) Assignee: Altair Semiconductor Ltd., Hod Hasharon (IL)

( * ) Notice: Subject to any disclaimer, the term of this patent is extended or adjusted under 35 U.S.C. 154(b) by 696 days.

(21) Appl. No.: 11/647,123

(22) Filed: Dec. 27, 2006

(65) Prior Publication Data

US 2008/0159439 A1 Jul. 3, 2008

(51) Int. Cl.
*H04W 4/00* (2009.01)

(52) U.S. Cl. .................. 370/328; 370/329; 370/336; 375/316; 455/574

(58) Field of Classification Search .................. None
See application file for complete search history.

(56) References Cited

U.S. PATENT DOCUMENTS

| | | | | |
|---|---|---|---|---|
| 5,241,542 | A | * | 8/1993 | Natarajan et al. ........... 370/311 |
| 5,376,929 | A | * | 12/1994 | Rakolta et al. ............. 340/7.35 |
| 5,956,656 | A | | 9/1999 | Yamazaki |
| 7,126,996 | B2 | * | 10/2006 | Classon et al. ............. 375/260 |
| 7,133,646 | B1 | | 11/2006 | Miao |
| 7,133,669 | B2 | | 11/2006 | Nair et al. |
| 7,363,051 | B2 | | 4/2008 | Bridgelall |
| 7,406,296 | B2 | | 7/2008 | Haartsen |
| 2002/0136233 | A1 | | 9/2002 | Chen et al. |
| 2002/0181509 | A1 | | 12/2002 | Mody et al. |
| 2003/0054788 | A1 | | 3/2003 | Sugar et al. |
| 2003/0086371 | A1 | | 5/2003 | Walton et al. |
| 2003/0169824 | A1 | | 9/2003 | Chayat |
| 2004/0014505 | A1 | * | 1/2004 | Rainish et al. .............. 455/574 |
| 2004/0029619 | A1 | | 2/2004 | Liang et al. |
| 2004/0162106 | A1 | | 8/2004 | Monroe et al. |
| 2005/0020299 | A1 | | 1/2005 | Malone et al. |
| 2005/0025093 | A1 | | 2/2005 | Yun et al. |
| 2005/0059347 | A1 | | 3/2005 | Haartsen |
| 2005/0195786 | A1 | | 9/2005 | Shpak |
| 2005/0266853 | A1 | | 12/2005 | Gallagher et al. |
| 2006/0198476 | A1 | | 9/2006 | Palaskas et al. |
| 2006/0221917 | A1 | | 10/2006 | McRae |

(Continued)

OTHER PUBLICATIONS

Specification of the Bluetooth System, Master Table of Contents & Compliance Requirements, Nov. 2004.

(Continued)

*Primary Examiner*—Rafael Pérez-Gutiérrez
*Assistant Examiner*—Daniel Nobile
(74) *Attorney, Agent, or Firm*—Abelman, Frayne & Schwab

(57) ABSTRACT

A terminal for use in a wireless network includes a radio frequency (RF) receiver, which is configured to receive and downconvert a RF signal. The RF signal includes a sequence of downlink frames, each downlink frame including at least a map zone followed by a data zone. The map zone contains an indication of a time allocation in the data zone during which downlink data will be transmitted to the terminal. An analog/digital (A/D) converter converts the output signal from the RF receiver into a stream of digital samples. A digital processing circuit processes the digital samples so as to identify the time allocation and to recover the downlink data transmitted during the identified time allocation, while shutting down the RF receiver during at least one interval during the downlink frame that is outside the identified time allocation.

20 Claims, 4 Drawing Sheets

U.S. PATENT DOCUMENTS

| | | | |
|---|---|---|---|
| 2007/0076649 | A1 | 4/2007 | Lin et al. |
| 2007/0082716 | A1* | 4/2007 | Behzad et al. ............... 455/574 |
| 2007/0104145 | A1 | 5/2007 | Jan |
| 2007/0124478 | A1 | 5/2007 | Abdelhamid et al. |
| 2007/0140256 | A1 | 6/2007 | Yaqub |
| 2007/0183383 | A1 | 8/2007 | Bitran et al. |
| 2007/0184798 | A1 | 8/2007 | Bitran et al. |
| 2007/0184835 | A1 | 8/2007 | Bitran et al. |
| 2007/0275746 | A1 | 11/2007 | Bitran |
| 2008/0240022 | A1* | 10/2008 | Yoon et al. ................... 370/329 |

OTHER PUBLICATIONS

David Gesbert, et al., "From Theory to Practice: An Overview of MIMO Space-Time Coded Wireless Systems", IEEE Journal on Selected Areas in Communications, vol. 21, No. 3, Apr. 2003.
U.S. Appl. No. 60/772,101.
U.S. Appl. No. 60/820,523.
U.S. Appl. No. 60/803,192.
http://www.ieee802.org/16.
http://www.wimaxforum.org.
http://www.nxp.com/products/connectivity.
TriMAX™, Altair White Paper, Rev. 1.00, Jul. 2006.
International Application PCT/IL2007/001600 Search Report dated Mar. 30, 2009.
IEEE Standard 802.16 for Local and metropolitan area networks, "Part 16: Air Interface for Fixed Broadband Wireless Access Systems", Revision of IEEE Standard 802.16-2001, IEEE Computer Society and IEE Microwave Theory and Techniques Society, USA, Oct. 1, 2004.
IEEE Standard 802.16e for Local and metropolitan area networks, "Part 16: Air Interface for Fixed Broadband Wireless Access Systems; Amendment 2 and Corrigendum 1", Physical and Medium Access Control Layers for Combined Fixed and Mobile Operation in Licensed Bands, Amendment and Corrigendum to IEEE Standard 802.16-2004, IEEE Computer Society and IEE Microwave Theory and Techniques Society, USA, 2005.
IEEE Inc., "A compilation based on IEEE Standard 802.11-1999 (revision 2003) and its amendments", IEEE Wireless LAN Edition, IEEE Press, USA, 2003.
Tomchik J., "QFDD and QTDD: Proposed Draft Air Interface Specification", IEEE 802.20 Working Group on Mobile Broadband Wireless Access, Qualcomm, Inc., USA, Oct. 28, 2005.

* cited by examiner

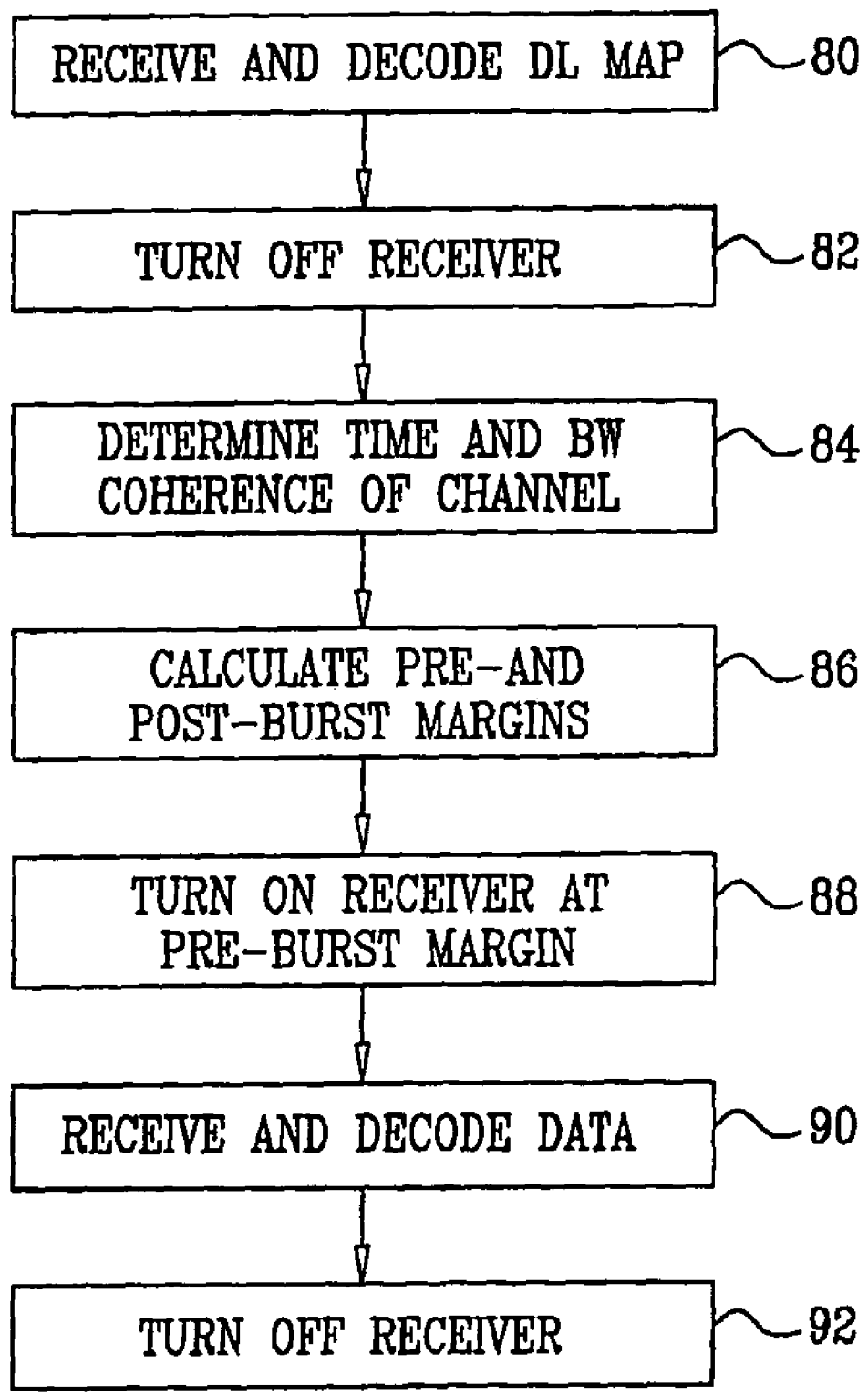

WIRELESS RECEIVER WITH INTERMITTENT SHUT-OFF OF RF CIRCUITS

FIELD OF THE INVENTION

The present invention relates generally to wireless communications, and specifically to controlling the operation of a wireless communication terminal.

BACKGROUND OF THE INVENTION

WiMAX (Worldwide Interoperability for Microwave Access) is a new technology for wireless packet data communications. WiMAX is similar in concept to wireless local area network (WLAN) technologies defined by IEEE standard 802.11, but has a number of enhancements designed to improve-performance and range. The original WiMAX standard, IEEE 802.16, specified WiMAX in the 10-66 GHz range. More recently, IEEE 802.16a added support for the 2-11 GHz range, and IEEE 802.16e (approved as IEEE 802.16-2005) extended WiMAX to mobile applications, using an enhanced orthogonal frequency division multiple access (OFDMA) modulation scheme. In the context of the present patent application and in the claims, the term "802.16" is used to refer collectively to the original IEEE 802.16 standard and all its variants and extensions, unless specifically noted otherwise.

For purposes of power saving, IEEE 802.16-2005 (see particularly section 6.3.21) defines a sleep mechanism, which can be used to reduce the duty cycle during which a mobile station (MS) must listen for downlink signals. To invoke the mechanism, the MS transmits a sleep request (SLP-REQ) signal to the base station, identifying the frames during which the MS will be sleeping and will therefore not receive downlink signals. During these sleep frames, the MS may shut down some of its circuits and thus reduce power consumption without risk of missing a downlink transmission.

SUMMARY OF THE INVENTION

In wireless multiple access systems such as WiMAX, the base station transmits and receives signals in a sequence of synchronous frames. The base station assigns respective time allocations to the wireless terminals for reception and transmission within each frame dynamically, depending on data transmission requirements. The base station typically transmits the assignments of the time allocations during a "map zone" near the beginning of each downlink frame, thus indicating the times during which downlink data will be transmitted to each terminal during the subsequent "data zone" of the frame (as well as subsequent uplink transmission times).

Disclosed embodiments of the present invention take advantage of this frame structure in order to shut down elements of the terminal during intervals within a downlink frame in which it is expected that there will be no data for the terminal to receive. The terminal circuits are activated to receive and process downlink data that are transmitted by the base station during the map zone and then during the assigned time allocation within the data zone. During intervals outside the assigned time allocation, however, certain elements of the terminal, such as the radio receiver, are shut down in order reduce power consumption. (The term "shutdown" is used broadly in the context of the present patent application and in the claims to refer to any change of operating mode that reduces power consumption by reducing functionality.) This sort of intra-frame shutdown may be used in addition to full-frame shutdown techniques, such as the sleep mechanism mentioned above, in order to minimize power consumption and maximize battery life of wireless terminals.

There is therefore provided, in accordance with an embodiment of the present invention, a terminal for use in a wireless network, the terminal including:

a radio frequency (RF) receiver, which is configured to receive and downconvert a RF signal so as to generate an output signal, the RF signal including a sequence of downlink frames, each downlink frame including at least a map zone followed by a data zone, the map zone containing an indication of a time allocation in the data zone during which downlink data will be transmitted to the terminal;

an analog/digital (A/D) converter, which is coupled to convert the output signal into a stream of digital samples; and a digital processing circuit, which is coupled to process the digital samples so as to identify the time allocation, responsively to the indication in the map zone, and to recover the downlink data transmitted during the identified time allocation, while shutting down the RF receiver during at least one interval during the downlink frame that is outside the identified time allocation.

In a disclosed embodiment, the digital processing circuit includes a digital physical layer interface (PHY), a medium access control (MAC) processor, and a power controller, which is coupled to shut down at least one digital component of the terminal, in addition to the RF receiver, during the at least one interval, wherein the at least one digital component is selected from a group of components consisting of the A/D converter, the PHY, and the MAC processor.

In some embodiments, the time allocation has a start time and an end time, and the digital processing circuit is configured to shut down the RF receiver after receiving the indication in the map zone, and then to activate the RF receiver at a first time that precedes the start time of the time allocation by a first margin, and to shut down the RF receiver at a second time that follows the end time of the time allocation by a second margin. Typically, the digital processing circuit is configured to process the digital samples during a first part of the downlink frame in order to determine one or more characteristics of a wireless channel over which the RF signal is received, and to determine the first and second margins responsively to the one or more characteristics. In a disclosed embodiment, the one or more characteristics include channel coherence characteristics, such as a temporal coherence and a bandwidth coherence, and the first and second margins increase as a coherence of the wireless channel decreases.

Additionally or alternatively, the one or more characteristics include a signal/noise ratio (SNR) of the wireless channel, and the first and second margins increase as the SNR of the wireless channel decreases.

Further additionally or alternatively, the downlink frame includes a preamble that precedes the map zone, and the digital processing circuit is configured to process the digital samples during the preamble in order to determine the one or more characteristics of the wireless channel.

In one embodiment, the digital processing circuit is configured to make a determination that no time has been allocated for transmission to the terminal during a given downlink frame, and to shut down the RF receiver through all of the data zone of the given downlink frame responsively to the determination.

In a disclosed embodiment, the sequence of downlink frames is transmitted by a base station in accordance with an IEEE 802.16 standard.

There is also provided, in accordance with an embodiment of the present invention, a method for communication, including:

receiving and downconverting a radio frequency (RF) signal using a RF receiver of a wireless terminal, so as to generate an output signal, the RF signal including a sequence of downlink frames, each downlink frame including at least a map zone followed by a data zone, the map zone containing an indication of a time allocation in the data zone during which downlink data will be transmitted to the wireless terminal;

converting the output signal into a stream of digital samples; and processing the digital samples so as to identify the time allocation, responsively to the indication in the map zone, and to recover the downlink data transmitted during the identified time allocation, while shutting down the RF receiver during at least one interval during the downlink frame that is outside the identified time allocation.

The present invention will be more fully understood from the following detailed description of the embodiments thereof, taken together with the drawings in which:

BRIEF DESCRIPTION OF THE DRAWINGS

FIG. 5 is a flow chart that schematically illustrates a method for activation and shutdown of elements of a wireless terminal, in accordance with an embodiment of the present invention.

DETAILED DESCRIPTION OF EMBODIMENTS

Figure 1:
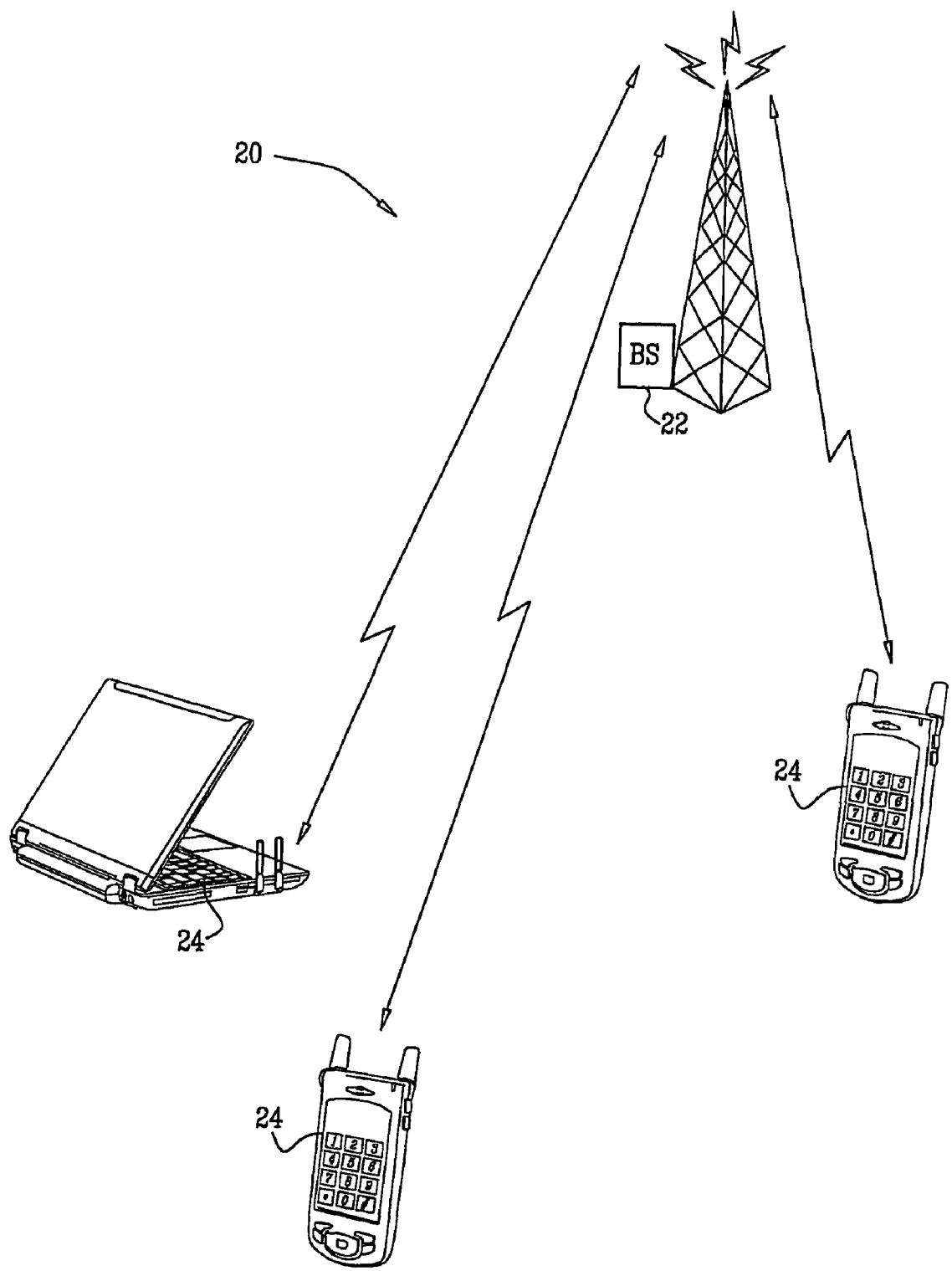
FIG. 1 is a schematic, pictorial illustration of a wireless network system, in accordance with an embodiment of the present invention.

FIG. 1 is a schematic, pictorial illustration of a wireless network system 20, in accordance with an embodiment of the present invention. In the description that follows, it will be assumed, for convenience and clarity, that system 20 operates in accordance with one or more of the WiMAX IEEE 802.16 standards cited above. Alternatively, system 20 may operate in accordance with other slotted multiple-access wireless standards. Standards of this sort are defined, for example, in the specifications of the Third Generation Partnership Project (3GPP) Long Term Evolution (LTE), 3GPP2 Evolution-Data Optimized (EVDO) Rev C, or the IEEE 802.20 High Speed Mobile Broadband Wireless Access (MBWA) specifications.

System 20 comprises multiple wireless terminals 24 (referred to as mobile stations in WiMAX parlance), which communicate with a base station 22 during certain assigned time allocations in a sequence of frames defined by the base station. The frame structure and timing are described hereinbelow with reference to FIG. 3. Optionally, terminals 24 may be configured for communication over other wireless networks, such as WLAN and/or Bluetooth networks, in addition to the WiMAX network, but this aspect of mobile station operation is beyond the scope of the present invention. Although certain types of wireless terminals are shown, by way of example, in FIG. 1, the term "wireless terminal" as used in the present patent application and in the claims should be understood broadly to refer to any and all suitable sorts of consumer electronics, computing and communication devices in which the principles of the present invention may be implemented.

Figure 2:
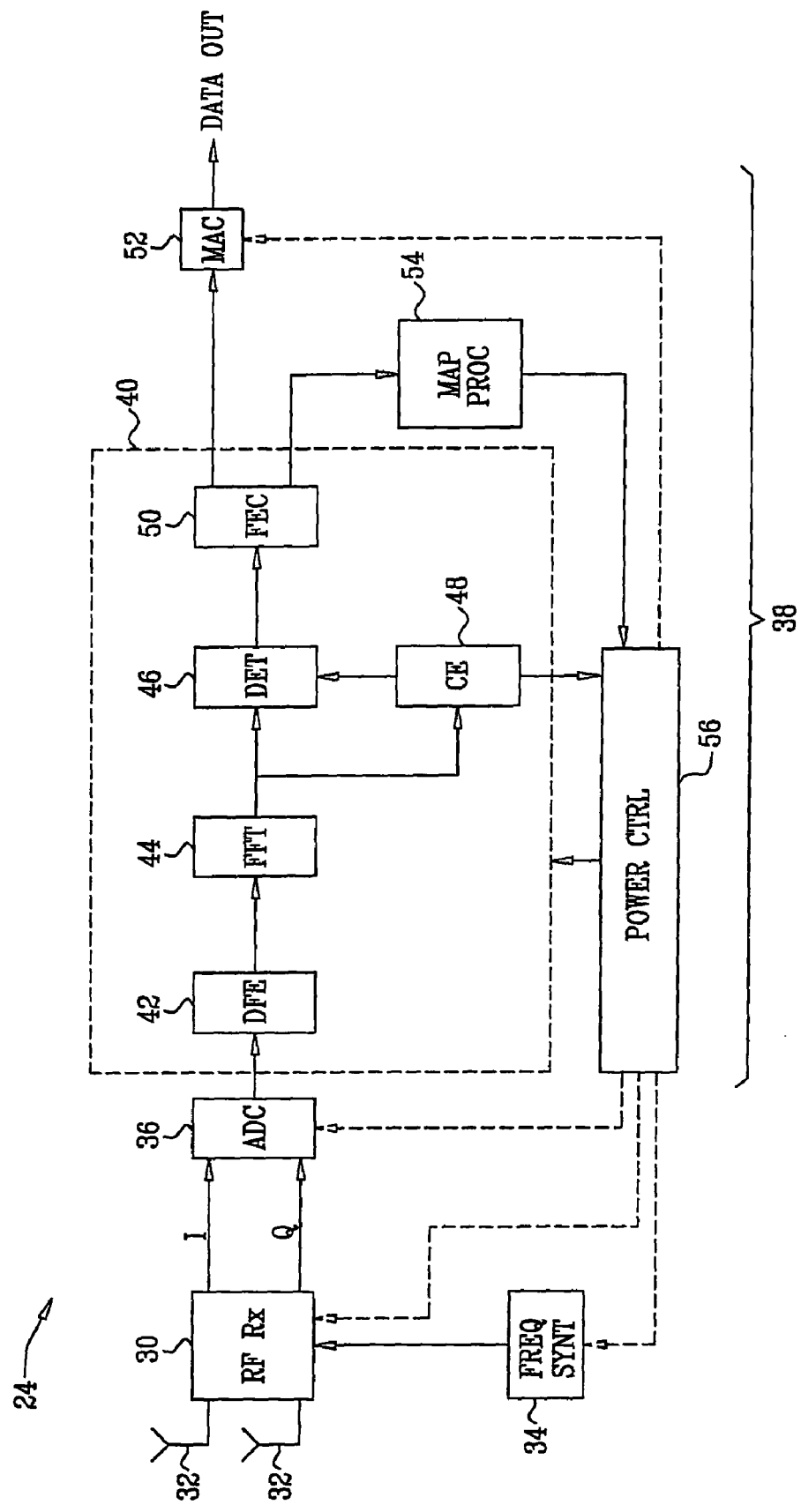
FIG. 2 is a block diagram that schematically illustrates a wireless terminal, in accordance with an embodiment of the present invention.

FIG. 2 is a block diagram that schematically shows elements of one of wireless terminals 24, in accordance with an embodiment of the present invention. The figure shows only certain elements of the data receiver portion of the wireless modem used in terminal 24 that are useful in understanding the present invention. The transmitter portion, host processor, and other elements of terminal 24 are omitted for the sake of simplicity.

Downlink signals transmitted by base station 22 are received by a radio frequency (RF) receiver 30 via antennas 32. RF receiver 30 amplifies, filters and downconverts the RF signals using a reference frequency input provided by a frequency synthesizer 34. Typically, the frequency synthesizer comprises a local oscillator with phase-locked loop (PLL) for frequency stabilization. RF receiver 30 generates a downconverted output signal, typically in the form of I and Q baseband signals, or alternatively as a complex intermediate frequency (IF) signal, as is known in the art. This output signal is converted into a stream of digital samples by an analog/digital (A/D) converter 36.

A digital processing circuit 38 processes the digital samples in order to recover the downlink data transmitted by the base station. Circuit 38 comprises a digital physical layer interface (PHY) 40, which converts the samples into a stream of data bits. The components of digital PHY 40 are known generally in the art, but they are described here for the sake of completeness: A digital front end (DFE) 42 performs initial filtering and resampling, following which the time-domain samples are converted to frequency-domain samples by a fast Fourier transform (FFT) processor 44. A detector 46 converts the samples into data symbols, using channel coefficients that are determined by a channel estimator (CE) 48 for each of the sub-carriers in the downlink signal. A forward error corrector (FEC) 50 decodes the symbols in order to recover the downlink data bit stream. A medium access control (MAC) processor 52 processes the data packets contained in the bit stream in order to extract the downlink data payloads and perform other MAC-level functions.

As will be explained in greater detail below, the downlink frames transmitted by base station 22 contain a map zone, in which the base station indicates the time slots and frequency sub-carriers that have been assigned to each wireless terminal 24. The map zone typically includes a downlink map, giving the slots in which downlink data will be transmitted to each wireless terminal, and an uplink map, giving the slots in which each wireless terminal may transmit uplink data in the next uplink frame. Wireless terminal 24 comprises a map processor 54, which processes the data in the map zone of the downlink frames in order to identify the downlink and uplink slots that have been assigned to this terminal. This sort of map processing is typically a function of the MAC processor, but it is shown here as a separate functional block for the sake of clarity.

A power controller 56 receives the slot assignment information from map processor 54, and uses this information in turning the other elements of wireless terminal 24 on and off as required. During a downlink frame that the wireless terminal has designated as a sleep frame (using the above-mentioned SLP-REQ message, for example), the power controller may shut off all the components of the receiver for the duration of the frame. On the other hand, even during downlink frames in which the terminal is prepared to receive data from the base station, the power controller may shut down certain components of the receiver during certain intervals within the frame. This novel function of the power controller is explained in detail with reference to the figures that follow. It permits the operating duty cycle of certain components of the wireless terminal to be reduced, thus reducing power consumption and extending battery life.

Although the components of wireless terminal 24 are shown in FIG. 2, for the sake of conceptual clarity, in terms of certain particular functional blocks, in practice these blocks may be parts of one or more dedicated or programmable integrated circuits. In particular, power controller 56 may be implemented either in software running on an embedded microprocessor or in a suitable logic circuit within a digital integrated circuit that also comprises PHY 40 and MAC processor 52. Alternatively, the power controller may comprise a separate microprocessor or logic circuit.

Figure 3:
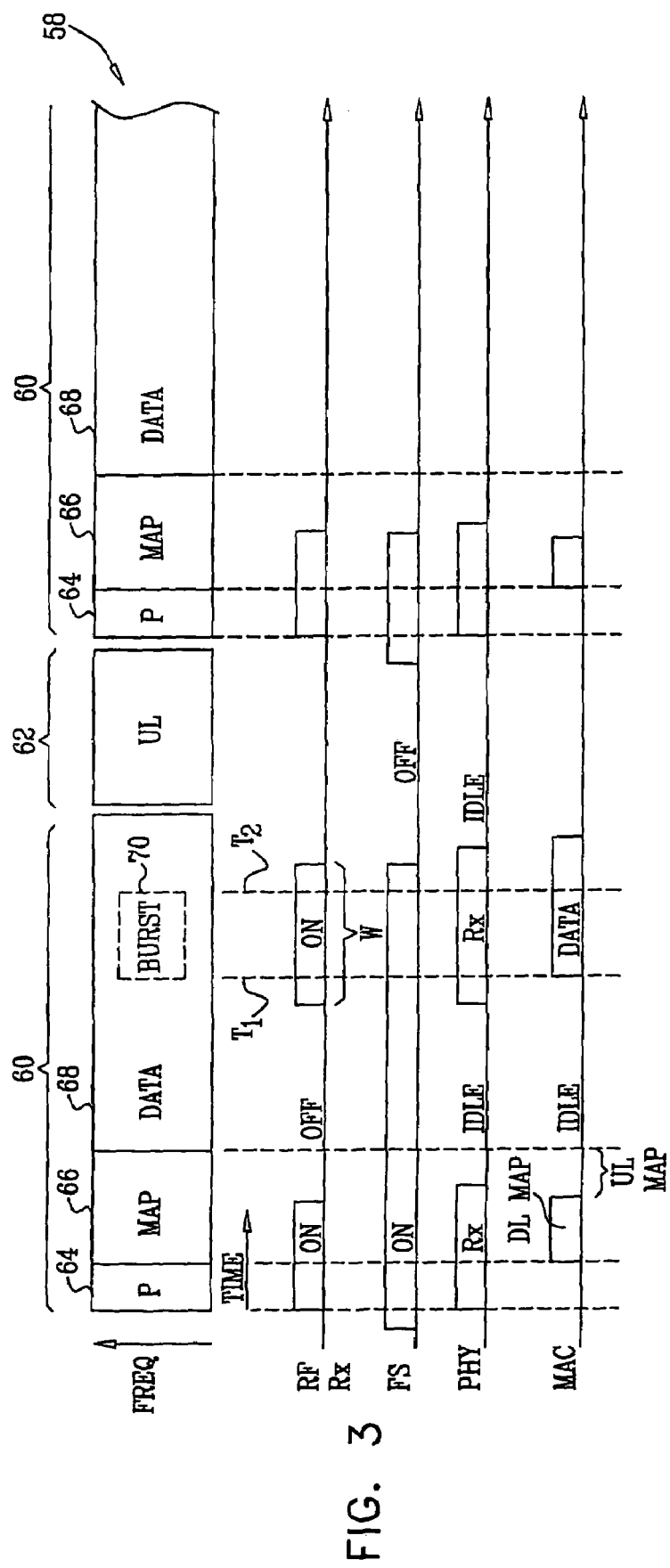
FIG. 3 is a schematic timing diagram showing a scheme for activation and shutdown of elements of a wireless terminal, in accordance with an embodiment of the present invention.

FIG. 3 is a schematic timing diagram that shows a scheme used by power controller 56 for activation and shutdown of components of wireless terminal 24, in accordance with an embodiment of the present invention. The scheme is keyed to a sequence 58 of downlink frames 60 and uplink frames 62 this is defined by timing signals transmitted by base station 22, in accordance with WiMAX standards. Each downlink frame comprises a preamble 64, containing a predefined symbol for synchronization purposes, followed by a map zone 66 and a data zone 68. (The view of the elements of frames 60 and 62 that is shown in FIG. 3 is simplified for the sake of clarity and omits parts of the frames that are not needed for an understanding of the present invention. Similarly, the names "map zone" and "data zone" are not specified by WiMAX standards but rather are used to denote functions carried out during certain portions of the downlink frame. The association between these "zones" and the relevant portions of the frames in WiMAX and other standards will be apparent to those skilled in the art.)

Map zone 66 typically comprises a downlink (DL) map, followed by an uplink (UL) map. The downlink map indicates a respective time allocation for each wireless terminal, comprising one or more bursts 70 within data zone 68 during which the base station will transmit downlink data to the wireless terminal, as well as the modulation and coding that the base station will apply to the downlink data in the corresponding bursts. In the present example, for the sake of simplicity, only a single burst 70 is shown and described, but the methods described hereinbelow may be extended in a straightforward manner to allocations comprising multiple bursts. Burst 70 is assumed to begin at a start time $T_1$ and end at an end time $T_2$ and to comprise a certain set of sub-carriers represented schematically by the vertical extent of the slot block in the figure. The burst may comprise a single slot or multiple slots, wherein each slot comprises a certain number of consecutive symbols over a certain number of subcarriers, as defined by WiMAX standards. The map zone may also contain broadcast packets (containing configuration information, for example), as well as additional maps (referred to as sub-maps in IEEE 802.16-2005).

As shown in FIG. 3, power controller 56 turns on RF receiver 30, frequency synthesizer 34, and PHY 40 during preamble 64 and map zone 66 in order to synchronize on downlink frame 60 and process the map information. MAC processor 52 is also activated during the map zone in order to extract the slot assignments and modulation/coding information from the map data. If wireless terminal 24 has requested a time allocation for uplink transmission, the power controller may activate the RF receiver, PHY and MAC processor during the entire map zone, in order to determine both the downlink and uplink slot assignments. Alternatively, if the wireless terminal has not requested an uplink allocation, the power controller may activate these circuits during only the downlink map portion of map zone 66, as shown in the figure.

Once the map information has been received and decoded, power controller 56 shuts down the RF receiver, PHY and MAC processor as soon as it has determined that there are no broadcast packets or sub-maps to follow. These components remain shut down during data zone 68 until the power controller reactivates them shortly before $T_1$. The frequency synthesizer may also be shut down during this interval or, alternatively, the frequency synthesizer may be left on, as shown in the figure, in order to avoid compromising frequency stability. After the wireless terminal has received and decoded the downlink data in burst 70, the power controller then shuts down the receiver components until they are needed again in the next downlink frame. Alternatively, if the map information in map zone 66 indicates that the base station has not assigned any downlink time allocation to the wireless terminal in the current downlink frame 60, then the power controller turns off the receiver components immediately after the map zone and does not activate them again until the beginning of the next downlink frame.

To enable the wireless terminals to perform channel estimation, base station 22 transmits pilot training signals at predetermined times and frequencies within each downlink frame 60, as defined by WiMAX standards. If wireless terminal 24 were stationary, and the channel invariant over time, it would be sufficient for channel estimator 48 (FIG. 2) to measure the channel coefficients once, and to use these coefficients thereafter without modification. In practice, however, motion of the wireless terminal and changes in channel conditions generally require that the wireless terminal continually receive and process the pilot signals transmitted by the base station in order to update the channel coefficients. To facilitate accurate updating of the channel coefficients, power controller 56 typically activates the receiver components for short periods before and after each burst 70, as shown in the figure and described in greater detail hereinbelow.

Figure 4:
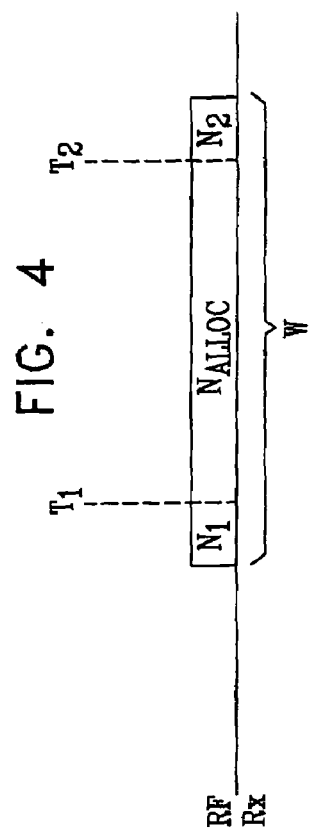
FIG. 4 is a schematic timing diagram showing a detail of the scheme of FIG. 3, in accordance with an embodiment of the present invention.

FIG. 4 is a schematic timing diagram that shows a detail of the timing scheme of FIG. 3, illustrating how power controller 56 times the activation and shutdown of RF receiver 30, in accordance with an embodiment of the present invention. Burst 70, as assigned by the base station, contains an allocated number, $N_{ALLOC}$, of data symbols. To capture additional pilot signals for channel estimation, the power controller turns on the RF receiver $N_1$ symbols before time $T_1$, and turns off the RF receiver $N_2$ symbols after time $T_2$. The total on-time of the RF receiver (in symbols) is thus $W=N_1+N_{ALLOC}+N_2$. The power controller times the activation and shutdown of the other receiver components accordingly.

The values of $N_1$ and $N_2$ depend on the coherence characteristics of the channel, such as the coherence bandwidth and coherence time. Specifically, when the wireless terminal is stationary or moving slowly, the channel will typically have high coherence time, i.e., there will be little change over time in the characteristics of successive pilot signals as received by the terminal. Channels with low delay-spread will typically have high coherence bandwidth, i.e., there will be relatively little change in channel response over the different frequency sub-carriers. When the coherence bandwidth and coherence time are high, the power controller may generally use relatively small values of $N_1$ and $N_2$, whereas larger values may be needed under conditions of high mobility and/or high delay-spread. High-order modulation schemes and low coding gain increase sensitivity of the receiver to noise, and therefore may also require increased values of $N_1$ and $N_2$. Methods for calculating $N_1$ and $N_2$ based on these principles are described hereinbelow.

FIG. 5 is a flow chart that schematically illustrates a method for intra-frame activation and shutdown of elements of wireless terminal 24 by power controller 56, in accordance with an embodiment of the present invention. Immediately before preamble 64 (FIG. 3) of each downlink frame 60 in which the wireless terminal may receive downlink signals from base station 22, the power controller activates the elements of the wireless terminal that are needed to receive and decode the signals, at an initial reception step 80. These elements include RF receiver 30, A/D converter 36 and PHY 40, as well as frequency synthesizer 34 (which may be activated earlier to allow time for stabilization). Activation of MAC processor 52 may be delayed until after the preamble. Alternatively, only certain elements of terminal 24 with high power consumption, such as the RF receiver, may be shut down and activated in this manner, while other elements remain continuously on.

Once the requisite elements have been activated, wireless terminal 24 receives preamble 64 and the downlink map in map zone 66, and decodes the downlink map in order to identify the time, frequency and modulation parameters of burst 70. If necessary, the receiving elements of the wireless terminal may remain active during the remainder of the map zone in order to receive uplink map information and/or broadcast packets. Otherwise, to minimize power consumption, power controller 56 shuts down the receiving elements of the wireless terminal as soon as the downlink map has been decoded, at an initial shutdown step 82. If the base station has not allocated any downlink time to the wireless terminal in the current downlink frame 60, the receiving elements of the wireless terminal will remain shut down until the next frame.

Assuming the base station has assigned a downlink time allocation to the wireless terminal, power controller 56 determines the time and bandwidth coherence of the channel, at a coherence determination step 84. The coherence calculation is based on channel parameters measured by channel estimator 48 during the preamble and map zone. For example, a temporal coherence parameter $R_N(N)$ and a bandwidth coherence parameter $R_K(K)$ may be calculated as follows, as a function of the separation K between sub-carriers and the separation N between symbols:

$$R_K(K) = \sum_{n,k} r(k,n) r^*(k-K, n) \quad (1)$$

$$R_N(N) = \sum_{n,k} r(k,n) r^*(k, n-N)$$

wherein r(k,n) is the received pilot signal on sub-carrier k at symbol n, and the sums are taken over all received sub-carriers and symbols. $R_N(N)$ and $R_K(K)$, in other words, represent the correlation between symbols or sub-carriers as a function of their separation. In high-coherence channels, these coherence parameters will have high values even for relatively large values of N and K, whereas in low-coherence channels, the coherence parameters will be significant only for small values of N and K.

Based on these coherence parameters, the coherence bandwidth $C_{BW}$ and coherence time $C_T$ may be estimated as follows:

$$C_{BW} = \mathrm{argmin}_k (|R_K(k)/R_K(0) - \sqrt{2}/2|)$$

$$C_T = \mathrm{argmin}_n (|R_N(n)/R_N(0) - \sqrt{2}/2|) \quad (2)$$

Alternatively, other methods may be applied for estimating coherence time and bandwidth, as will be apparent to those skilled in the art. For example, the coherence time may be estimated simply based on gain variation between frames.

Using the coherence time and bandwidth determined at step 84, power controller 56 calculates the pre- and post-burst margins, $N_1$ and $N_2$, at a margin calculation step 86.

$$N_1 = f_1(C_{BW}, C_T, \sigma_n, \sigma_{MCS})$$

$$N_2 = f_2(C_{BW}, C_T, \sigma_n, \sigma_{MCS}) \quad (3)$$

Here $f_1$ and $f_2$ are predefined functions, which are typically stored by power controller 56 in the form of lookup tables. The functions are based on the coherence bandwidth and time, on the channel noise $\sigma_n$, and on the noise margin (i.e., the maximum permissible noise) associated with the modulation and coding scheme in use during the bursts indicated by the map, $\sigma_{MCS}$.

Various different functional forms may be used for $f_1$ and $f_2$, with the general characteristic that the margins $N_1$ and $N_2$ decrease as the coherence bandwidth, coherence time and signal/noise ratio (SNR) increase. Thus, for example, in low-mobility channels with good signal reception, the values of $N_1$ and $N_2$ will be small. If the length of burst 70, $N_{ALLOC}$, is also small (i.e., data transmitted in short bursts, as in voice communications, for instance), then the active duty cycle of the RF receiver and other circuits will be substantially reduced by shutting down the receiver circuits outside time W. On the other hand, the increase in margin values with channel degradation and wireless terminal mobility will ensure that data reception performance is not lost under these conditions relative to convention terminals in which the receiver circuits remain active throughout the downlink frame.

In one embodiment, the functions $f_1$ and $f_2$ may be defined, for cases of low SNR, on the basis of the target mean-square error of the channel estimator, $\mathrm{MSE} = 10^{\sigma_{MCS}/10} - 10^{\sigma_n/10}$:

$$f_1 = f_2 \quad (4)$$

$$= \max\left\{ 0, 0.5 * F * \left( \frac{10^{\sigma_n/10}}{MSE} \right)^2 \Big/ C_{BW} - N_{alloc}/2 \right\}$$

In this formula, F is a scaling factor, which may be defined heuristically. For high SNR ($\sigma_n$ below a predefined threshold), an increased effective coherence bandwidth, $C_{BW\text{-}eff}$, which is adjusted for the channel noise $\sigma_n$, may be used in place of $C_{BW}$ in equation (4). Alternatively, in the high-SNR case, $C_{BW}$ may be replaced by $k_{eff} = \|w\|$, wherein w is the channel smoothing filter (which typically depends on $C_{BW}$ and $\sigma_n$, as is known in the art). Optionally, for channels with high temporal coherence ($C_T$ greater than a certain threshold), the values of $f_1$ and $f_2$ may be set to zero, and the channel estimate determined in the preamble may be used without modification in the data zone, as long as space-time coding is not used in the data zone.

The above functions are presented solely by way of example, and alternative functions may be used with similar results. When wireless terminal 24 comprises dual antennas 32, the applicable dual-antenna operating mode may cause the pilots to be diluted and the channel estimation performance requirements to be more demanding. The functions $f_1$ and $f_2$ may be adjusted to take into consideration the attributes of channel estimation under these conditions.

Using the pre-burst margin value calculated at step 86, power controller 56 turns on RF receiver 30 at a time that is $N_1$ symbols before the beginning of burst 70, at a pre-burst activation step 88. Frequency synthesizer 34 is activated shortly before this time, if the synthesizer was previously shut down. The power controller also activates A/D converter 36 and PHY 40 to process the signals that are output by the RF receiver. MAC processor 52 may be activated later, at time $T_1$, after the assigned time bursts are actually decoded by FEC 50.

RF receiver 30 and associated elements of wireless terminal 24 receive signals through the entire on-time $W=N_1+N_{ALLOC}+N_2$, at a data reception step 90. PHY 40 processes the signals throughout this time period in order to update its estimate of channel characteristics and to demodulate the data on the signal sub-carriers using the channel estimate.

Upon conclusion of the post-burst margin, at a time that is $N_2$ symbols after the end of burst 70, power controller 56 shuts down RF receiver 30, at a post-burst shutdown step 92. Frequency synthesizer 34 and A/D converter 36 may also be shut down at this point. Typically, PHY 40 and MAC processor 52 are shut down a short time later, after they have completed processing of the data transmitted during burst 70. The receiving elements of wireless terminal 24 may remain shut down until the preamble of the next downlink frame in which the terminal may expect to receive data.

Although the embodiments described above relate to certain specific aspects of WiMAX systems and protocols, the principles of the present invention may also be implemented, mutatis mutandis, in systems using other slotted multiple-access wireless standards. It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A terminal for use in a wireless network, the terminal comprising:
 a radio frequency (RF) receiver, which is configured to receive and downconvert a RF signal over a wireless channel so as to generate an output signal, the RF signal comprising a sequence of downlink frames, each downlink frame comprising at least a map zone followed by a data zone, the map zone containing an indication of a time allocation in the data zone during which downlink data will be transmitted to the terminal;
 an analog/digital (A/D) converter, which is coupled to convert the output signal into a stream of digital samples; and
 a digital processing circuit, which is coupled to process the digital samples in the map zone of each downlink frame so as to identify the time allocation and so as to estimate one or more characteristics of the wireless channel in order to calculate a margin as a function of the characteristics estimated over the map zone, and then to process the digital samples in the data zone of the downlink frame so as to recover the downlink data transmitted during the identified time allocation, and to shut down the RF receiver at a shut-down time that follows an end time of the time allocation in the downlink frame by the margin.

2. The terminal according to claim 1, wherein the digital processing circuit comprises;
 a digital physical layer interface (PHY);
 a medium access control (MAC) processor; and
 a power controller, which is coupled to shut down at least one digital component of the terminal, in addition to the RF receiver, at the shut-down time, wherein the at least one digital component is selected from a group of components consisting of the A/D converter, the PHY, and the MAC processor.

3. The terminal according to claim 1, wherein the time allocation has a start time, and wherein the digital processing circuit is configured to calculate a pre-allocation margin as a function of the characteristics estimated over the map zone, to shut down the RF receiver after receiving at least part of the map zone, and then to activate the RF receiver at a first an activation time that precedes the start time of the time allocation by the pre-allocation margin.

4. The terminal according to claim 1, wherein the one or more characteristics comprise channel coherence characteristics, and wherein the margin increases as a coherence of the wireless channel decreases.

5. The terminal according to claim 4, wherein the channel coherence characteristics comprise a temporal coherence and a bandwidth coherence.

6. The terminal according to claim 1, wherein the one or more characteristics comprise a signal/noise ratio (SNR) of the wireless channel, and wherein the margin increases as the SNR of the wireless channel decreases.

7. The terminal according to claim 1, wherein the downlink frame comprises a preamble that precedes the map zone, and wherein the digital processing circuit is configured to process the digital samples during the preamble in order to determine the one or more characteristics of the wireless channel.

8. The terminal according to claim claim 1, wherein the digital processing circuit is configured to make a determination that no time has been allocated for transmission to the terminal during a given downlink frame, and to shut down the RF receiver through all of the data zone of the given downlink frame responsively to the determination.

9. The terminal according to claim 1, wherein the sequence of downlink frames is transmitted by a base station in accordance with an IEEE 802.16 standard.

10. The terminal according to claim 1, wherein the digital processing circuit is coupled to activate the RF receiver once in order to receive the map zone, to shut down the RF receiver following reception of the map zone, and to re-activate the RF receiver in order to receive the downlink data in the identified time allocation.

11. A method for communication, comprising:
 receiving and downconverting a radio frequency (RF) signal using a RF receiver of a wireless terminal, so as to generate an output signal, the RF signal comprising a sequence of downlink frames, each downlink frame comprising at least a map zone followed by a data zone, the map zone containing an indication of a time allocation in the data zone during which downlink data will be transmitted to the wireless terminal;
 converting the output signal into a stream of digital samples;
 processing the digital samples in the map zone of each downlink frame so as to identify the time allocation and so as to estimate one or more characteristics of the wireless channel in order to calculate a margin as a function of the characteristics estimated over the map zone;

processing the digital samples in the data zone of the downlink frame so as to recover the downlink data transmitted during the identified time allocation; and shutting down the RF receiver at a shut-down time that follows an end time of the time allocation in the downlink frame by the margin.

12. The method according to claim 11, and comprising shutting down at least one digital component of the wireless terminal, in addition to the RF receiver, at the shut-down time, wherein the at least one digital component is selected from a group of components consisting of an analog/digital (A/D) converter, a digital physical layer interface (PHY), and a medium access control (MAC) processor.

13. The method according to claim 11, wherein the time allocation has a start time, and comprising calculating a pre-allocation margin as a function of the characteristics estimated over the map zone, and controlling the RF receiver so as to shut down the RF receiver after receiving at least part of the map zone, and then to activate the RF receiver at an activation time that precedes the start time of the time allocation by a the pre-allocation margin.

14. The method according to claim 11, wherein the one or more characteristics comprise channel coherence characteristics, and wherein the margin increases as a coherence of the wireless channel decreases.

15. The method according to claim 14, wherein the channel coherence characteristics comprise a temporal coherence and a bandwidth coherence.

16. The method according to claim 11, wherein the one or more characteristics comprise a signal/noise ratio (SNR) of the wireless channel, and wherein the margin increases as the SNR of the wireless channel decreases.

17. The method according to claim 11, wherein the downlink frame comprises a preamble that precedes the map zone, and comprising processing the digital samples during the preamble in order to determine the one or more characteristics of the wireless channel.

18. The method according to claim 11, wherein processing the digital samples in the map zone comprises making a determination that no time has been allocated for transmission to the terminal during a given downlink frame, and shutting down the RF receiver through all of the data zone of the given downlink frame responsively to the determination.

19. The method according to claim 11, wherein the sequence of downlink frames is transmitted by a base station in accordance with an IEEE 802.16 standard.

20. The method according to claim 11, and comprising activating the RF receiver once in order to receive the map zone, shutting down the RF receiver following reception of the map zone, and re-activating the RF receiver in order to receive the downlink data in the identified time allocation.

* * * * *